Jan. 15, 1952     C. MOREY     2,582,556
ELECTROHYDRAULIC VALVE OPERATING MECHANISM
Filed April 14, 1945     3 Sheets-Sheet 1
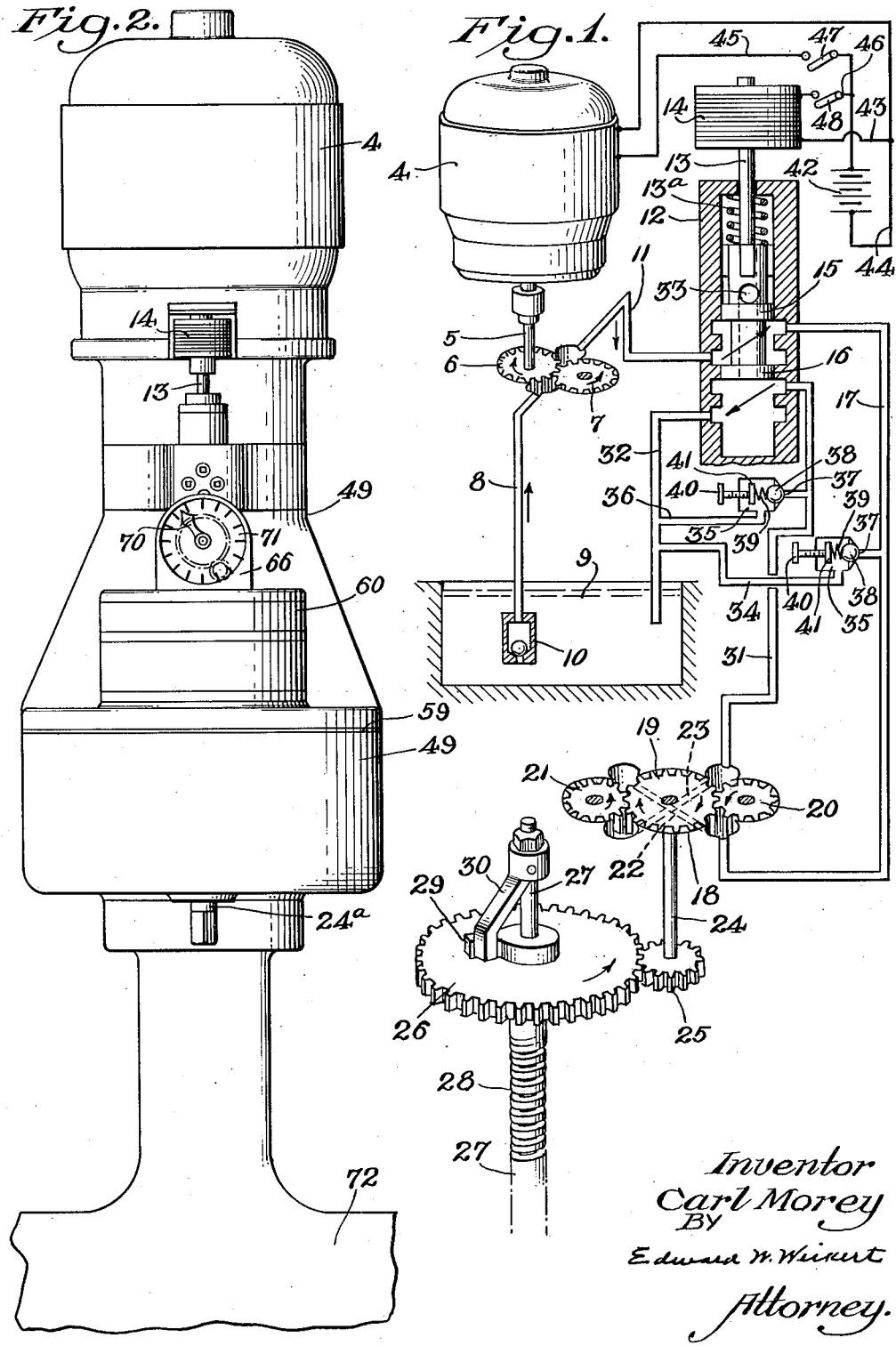
Inventor
Carl Morey
By
Edward W. Weikert
Attorney.

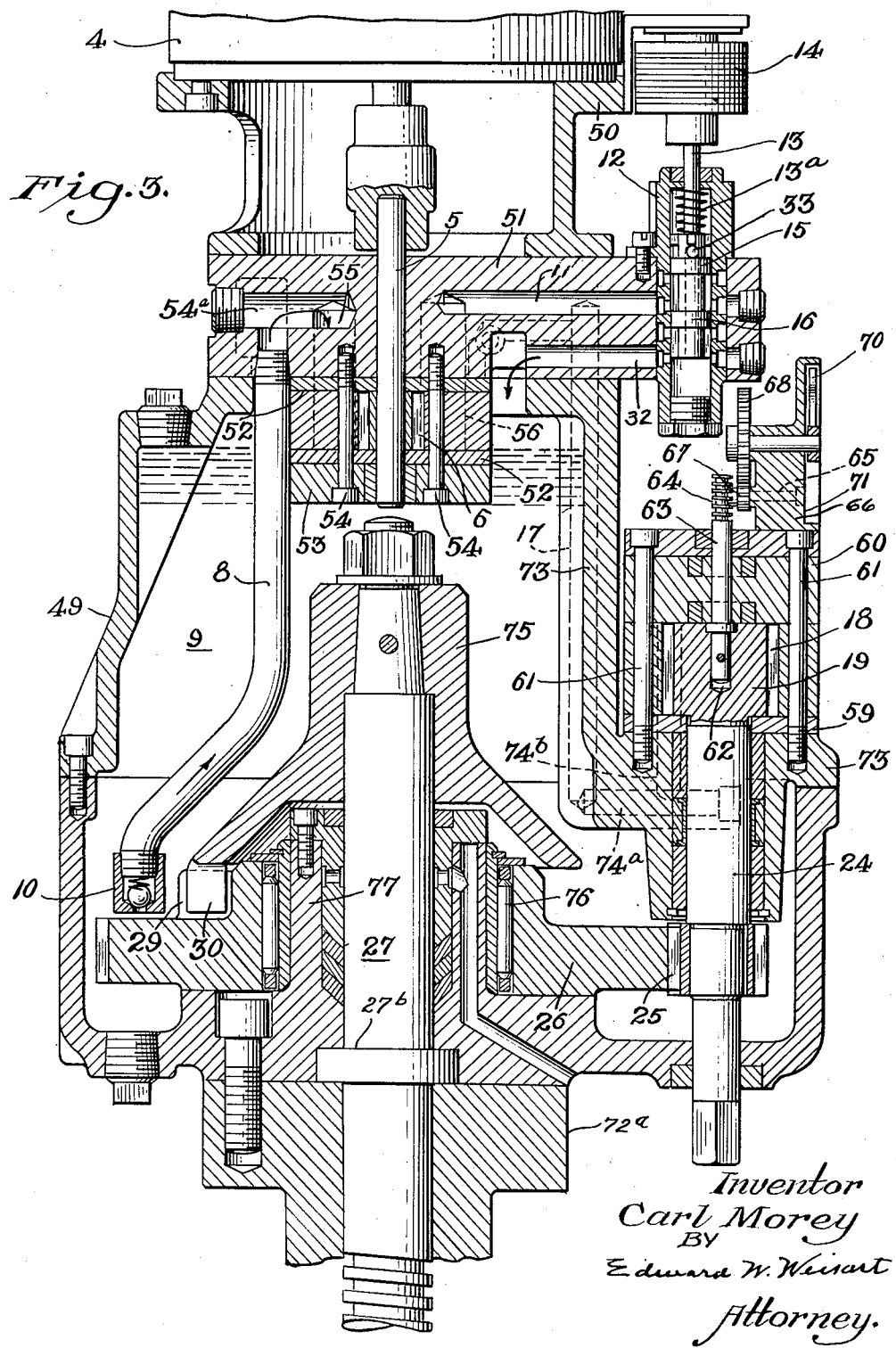

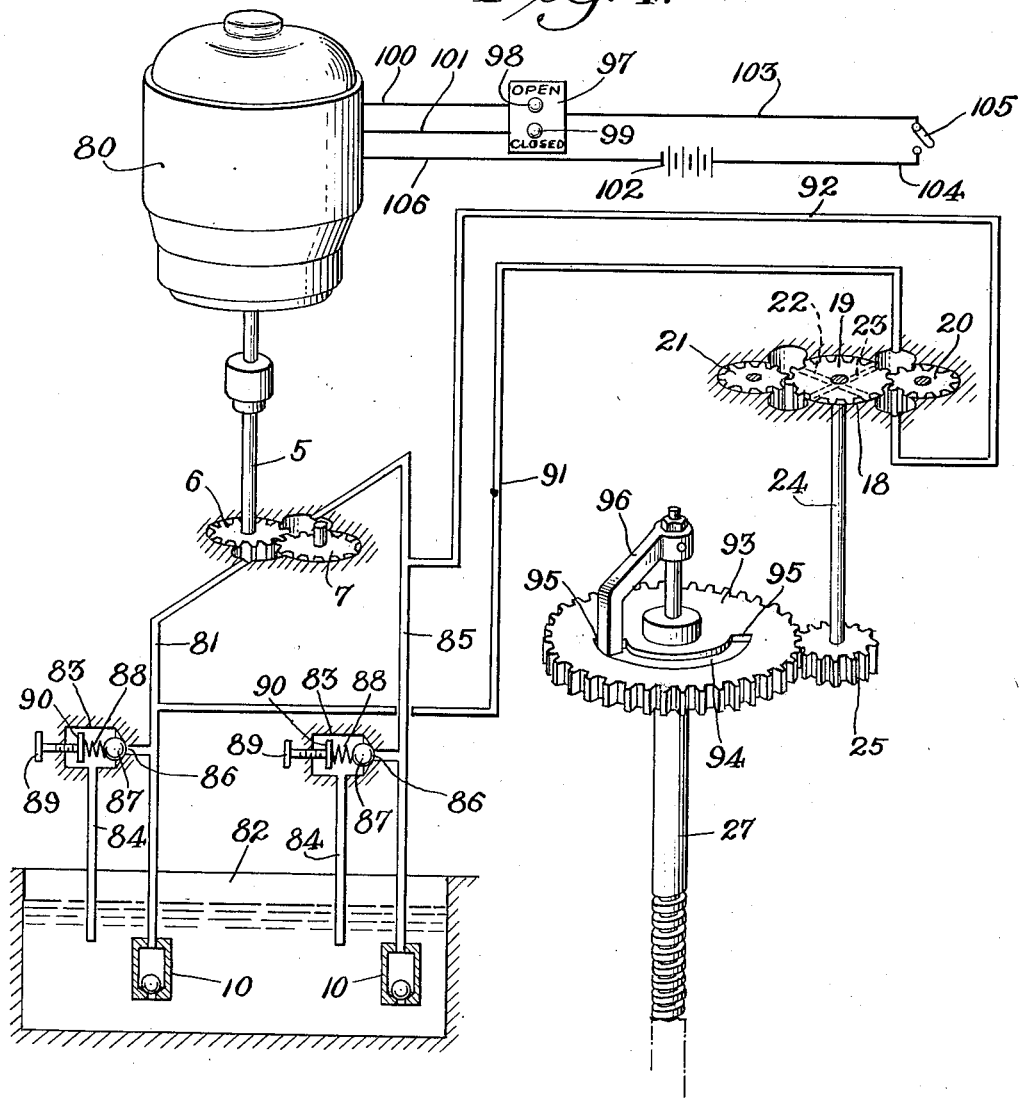

Patented Jan. 15, 1952

2,582,556

UNITED STATES PATENT OFFICE 2,582,556

ELECTROHYDRAULIC VALVE OPERATING MECHANISM

Carl Morey, Hamilton, Ohio, assignor to Economy Pumps, Inc., Hamilton, Ohio, a corporation of Illinois Application April 14, 1945, Serial No. 588,340

5 Claims. (Cl. 60—53)

This invention relates to an electro-hydraulic valve operating mechanism primarily designed for controlling gate valves, but which readily are adaptable for controlling other similar valves.

It is an object of this invention to provide a fluid operating means which can be adjusted to provide a predetermined closing force and a predetermined opening force which can be materially greater than the closing force, and in which a substantial impact occurs for dislodging the valve or gate from a tight fitting or set closing position.

It is a further object of this invention to provide a safety feature that will allow the operating motor to run momentarily after the valve has been closed or opened without injury to parts, and in which the mechanism may be put in operation by remote control to eliminate electric devices in explosive areas.

With these and other objects in view, this invention comprises the novel structure and combination of parts hereinafter described and more particularly pointed out and defined in the appended claims.

In the accompanying drawings which illustrate a preferred form of this invention and in which similar reference numerals refer to similar features in the different views:

Fig. 1 is a part diagrammatic, part elevational and part sectional view of a valve operating mechanism involving this invention;

Fig. 2 is a front elevational view of a housing containing the mechanism;

Fig. 3 is an enlarged sectional view of the housing, and

Fig. 4 is an elevational and diagrammatic view illustrating an improved modification of the invention.

In referring now to the drawing, especially to Fig. 1, there is shown an electric motor 4 having a shaft 5 upon which a pump gear 6 is secured which meshes with a second pump gear 7 of such a gear pump as is disclosed in my co-pending application Ser. No. 583,434, filed March 19, 1945, now abandoned. One side of this pump is connected to suction pipes 8 which etxend to a source of oil or fluid supply 9. The lower end of this pipe 8 is preferably provided with a fluid inlet valve 10 which allows fluid to enter, but not to escape.

The other or discharge side of this pump is connected by a pipe 11 with a reversing valve 12 provided with a valve stem 13 adapted to be operated by a solenoid 14. This valve stem carries two spaced valve discs 15 and 16 which control the flow therefrom. In the present position of the valve, the fluid entering the same, will escape through pipe 17 and enter upon one side of hydraulic motor 18 comprising a large central gear 19 and side gears 20 and 21 meshing therewith as disclosed in my said copending application 583,434 filed March 19, 1945. The inlets and outlets of this hydraulic motor may be connected by oblique conduits 22 and 23 shown in dotted lines.

The gear 19 is secured upon a shaft 24 which has a small pinion 25 thereon which meshes with a large gear 26 which is mounted to rotate freely around a valve shaft 27 which is suitably threaded as indicated at 28 for operating a gate valve for a manhole or the like. The gear 26 has a lug or abutment 29 upon its upper face which may be in the form of a segment of a circle of suitable extent. The ends of this lug 29 afford shoulders for engagement by an arm 30 secured upon the upper end of the shaft 27. In the present instance, the lug 29 is of such an extent as to provide a lost motion of substantially 300 degrees for arm 30.

As a result of this construction when the motor is started, for opening the gate valve, the gear 26 will rotate about 300 degrees before it becomes clutched to shaft 27 through lug 29 and arm 30 for picking up the load, at which time the motor will have acquired sufficient speed for causing lug 29 to impart a sufficiently powerful impact against the arm 30 for starting the screw shaft 27 and dislodging the gate valve or the like from its seat.

In the position of the parts as shown in Fig. 1, the fluid or oil which is preferably used is designed to be discharged from the hydraulic motor 18 through a pipe 31 which connects with the reversing valve 12 below pipe 17. A discharge pipe 32 extends from the reversing valve for conveying the returned fluid to the tank 9.

When the reversing valve is reversed, the oil will pass therefrom through pipe 31 to the hydraulic motor 18 which will be rotated in the opposite direction for rotating gear 26 in the opposite direction and causing lug 29 to travel idly for about 300 degrees until it engages the opposite side of arm 30. During this reverse rotation, the oil from the hydraulic motor 18 will be discharged through pipe 17 into reversing valve 12 from which it will escape through passage 33 to the lower end of the valve housing and then through pipe 32 to tank 9.

The pipe 17 is connected with pipe 32 by a flow pipe or connection 34 including a check valve 35 which opens toward pipe 32. Likewise, the pipe 31 is connected to pipe 32 by a pipe or flow connection 36 which also contains a check valve 35.

The inlet port 37 of each check valve is normally closed by a ball 38 which is yieldingly held against its seat by a coil spring 39, the tension of which may be adjusted by means of a screw 40 threaded in the end of the check valve and having a head 41, pressing against the spring. Accordingly, these relief valves may be adjusted to increase or decrease the pressures in the pipes 17 and 31 when feeding fluid to the hydraulic motor and to also protect the pump and hydraulic motor against overload and injury.

The aforementioned solenoid 14 is in circuit with a source of energy 42 and the electric motor 4 through the conductors 43, 44, 45 and 46, the latter of which are controlled by switches 47 and 48 which of course may be at any remote point. The solenoid is controlled by the switch 48 as is readily apparent.

The solenoid 14 moves the valve rod in one direction against the tension of spring 13a which moves the same in the other direction when released by the solenoid.

In Figs. 2 and 3, there is shown a housing 49 embodying the mechanism just described and which is supported upon the valve bonnet 72a. At the upper end of this housing there is a seat 50 for the motor 4 which is coupled to the shaft 5 having the gear 6 thereon of the fluid pump. This shaft 5 is journalled in a bearing and port block 51 below the seat and the fluid pump with its casing 52 is confined between the bearing 51 and a lower block 53 by means of the screw bolts 54.

The housing is provided with an oil or fluid chamber 9 from which feed pipe 8 having an inlet valve 10 at its lower end extends into the bearing block 51 where it communicates with a passage 54a in said block. The passage 54a communicates with a passage 55 leading to the fluid pump.

The fluid pump 6—7 discharges through a passage 56 shown in dotted lines which communicates with a passage 57 leading to the reversing valve 12 previously described. The reversing valve discharges the returned oil through passage 58 leading to the oil chamber 9. It will be noted that the passages 54a, 55, 57 and 58 are all formed in the bearing block 51 which while separate from the housing constitutes a part thereof.

Below the reversing valve 12, there is suitably mounted the hydraulic motor 18 between the seat 59 and a top block 60 by means of the screw bolts 61. The driven shaft 24 of the hydraulic motor which is shown integral with gear 19 has a socket 62 in its upper end in which the lower end of a shaft 63 is secured. The shaft 63 carries a worm 64 at its upper end which drives a shaft 65 journalled in a bearing block 66 rising above the block 60. The shaft 65 carries a small pinion 67 which drives a gear 68 secured on a shaft 69 journalled in the block 66 and extending therebeyond. A pointer 70 is mounted upon the outer end of shaft 69 and moves over a dial 71 upon the vertical face of block 66.

Any rotation of hydraulic motor shaft 24 will obviously cause rotation of the pointer 70 over the dial for indicating the position of the gate valve 72 (Fig. 2) on the lower end of the screw shaft 27 which is rotated by the motor and which has a collar 27b resting upon the valve bonnet 72a.

The housing 49 has a frame member 73 which forms the seat 59 for the hydraulic motor 18 and which extends upwardly against the bearing and port block 51. The reversing valve 12 is adapted to communicate with the hydraulic motor 18 by means of passages in block 51 and frame member 73 in accordance with the teachings of Fig. 1. In Fig. 3, there is shown in dotted lines a passage 17 in frame member 73 leading from block 51 to a point below the hydraulic motor 18 and then through passages 74a and 74b to one side of the hydraulic motor. The upper end of this passage 17 communicates with the reversing valve through a passage not shown. Such passages may be duplicated between the reversing valve and the hydraulic motor to the other side of said hydraulic motor. In view of Fig. 1, it appears unnecessary to fully illustrate such passages in Fig. 3, nor the relief valves.

Rotation of shaft 24 through hydraulic motor 18 will cause rotation of gear 25 on shaft 24 which in turn will rotate gear 26 carrying lug 29 around for impact with arm 30 extending from a cap piece 75 on shaft 27 which shrouds the bearings 76 between the gear 26 and a bearing sleeve 77 rising from the lower part of the housing; in which sleeve 77 the shaft 27 is journalled in any suitable manner. In the present instance, a gate valve as indicated in Fig. 2 is adapted to have a threaded relation with said shaft, but it will be evident that various kinds of valves may be operated by said shaft.

In Fig. 4, there is shown a modified form of the invention wherein an electric reversing motor 80 is used and the reversing valve is eliminated. In this view the motor 80 is shown coupled to the shaft 5 which is connected to gear 6 of the gear pump. The gear 6 drives gear 7 of the pump which is similar to the one previously described. One side of this pump is connected by suitable piping 81 with an oil tank 82. A check valve 10 is preferably secured to the lower end of this piping and a relief valve 83 which discharges into the tank through a pipe 84 is connected to an intermediate portion of said piping.

The other side of the pump is connected by piping 85 with the oil tank 82. A check valve 10 is preferably secured to the lower end of the piping 85 and a relief valve 83 which discharges into the tank 82 through pipe 84 is connected to an intermediate point of said piping. Thus it will be evident that the pump can draw oil from the tank through either pipe 81 or 85 depending upon the direction of rotation of the motor 80.

Each relief valve 83 has an inlet port 86 normally closed by a ball valve 87 which is yieldingly held against its seat by a coil spring 88, the tension of which may be adjusted by screw 89 threaded in the end of the housing and having an inner head 90 engaging said spring. By adjusting these screws, the valves can be adjusted for varying the pressure in the system.

The piping 81 is connected by a pipe 91 with one side of a hydraulic motor 18 of the type previously set forth, while the piping 85 is connected by a pipe 92 with the other side of the hydraulic motor 18. The hydraulic motor 18 comprises a large central gear 19 which meshes with the side gears 20 and 21 as in the first form. And the inlets and outlets of this motor are connected by the grooves 22 and 23.

A shaft 24 is connected to the gear 19 and carries a pinion 25 which meshes with a large driven gear 93 which rotates freely about a screw shaft 27 to which a gate valve or the like is adapted to be attached. The upper face of the gear 93 is provided with an arcuate groove 94 terminating in a shoulder 95 at each end. In the present instance, this groove is about 180 degrees in extent, but this may be varied as desired.

The shaft 27 extends above the gear 93 and carries an angular arm 96 fast thereon at its upper end. The lower end of said arm extends into said groove and is adapted for engaging either of the shoulders 95 of said groove for coupling the shaft with the gear 93 for conjoint rotation. It will be appreciated that acccording to this construction, the gear 93 will rotate idly substantially 180 degrees before picking up arm 96 and the load. This allows the motor 80 to attain sufficient speed and power before the load is picked up and at the same time a sufficiently powerful impact will be imparted to arm 96 to start the rotation of shaft 27 against any holding tendency of the gate valve or the like. Thus a lost motion impact producing connection between the screw shaft and gear has been provided as in the first instance. But the impact is cushioned to a certain extent by the fluid driving means.

In using this modified form, it is contemplated to connect shaft 24 or gear 19 with a pointer 70 and dial 71 as shown in Fig. 3 for indicating the position of the gate valve whether it is closed or open or in an intermediate position, since it can be started or stopped in any position by manipulation of push button switches which can be located at any convenient or remote point.

To this end there is shown diagrammatically a push button switch 97 having an opening button 98 and a closing button 99. The switch is connected with the motor 80 for the wires 100 and 101 and with a source of energy 102 through conductors 103 and 104 and main switch 105. The source of energy is connected with the motor through wire 106 for completing the circuit.

To open the gate valve, it is only necessary to push the button 98 for starting the motor 80 in the proper direction for opening the valve, and keeping it pressed down until the valve is opened or opened as far as desired, which will be indicated on the dial. To close the valve, the push button 99 will be pressed and kept pressed until the valve is closed during which period the motor will be running in the reverse direction. But if the push button should not be released in time, the motor can continue to run without damage since the fluid can escape through a relief valve.

It will be noted that when piping 92 is feeding oil to the hydraulic motor, piping 91 is returning oil to the pump 6—7 and when piping 91 is feeding oil, piping 92 is returning oil to the pump. Thus it will be evident that this system is in fact a reversible circulating system which is kept constantly replenished by drawing whatever oil is necessary from the tank 82.

It will be appreciated that by adjusting the relief valves, a predetermined closing and opening force can be obtained and that this force can be varied. It will also be evident that the fluid system herein will eliminate injury from any source due to the safety features described. At the same time, the starting impact imparted to the valve shaft serves an important function in jarring the gate valve for ready movement, while the reaction to the impact will be cushioned to some extent by the fluid driving means. In addition, the possible remote push button control and the indicating means combine to produce effective and ready operation.

I am aware that many changes may be made and various details of construction may be modified without departing from the principles of this invention, so I do not propose limiting the patent granted thereon necessitated by the appended claims.

I claim as my invention:

1. In a valve operating housing having a bottom seat adapted to be supported upon a valve bonnet, a valve stem extending through said bottom seat and into said housing, a sleeve-like bearing extending upwardly from said seat and surrounding said stem, a gear journalled upon said bearing sleeve and having an abutment upon its upper face, a skirt upon the upper end of said valve stem and extending over the upper end of said bearing sleeve and having an arm extending into the path of said abutment, a hydraulic motor in said housing having a gear in mesh with said first mentioned gear, a bearing block in the top of said housing, a pump bolted to the bottom of said bearing block, the interior of said housing forming a fluid chamber, a fluid inlet pipe extending from said chamber into said bearing block, said bearing block having a flow passage from said inlet pipe to said pump and an outlet flow passage from said pump and valve means connecting said outlet passage with said hydraulic motor.

2. In a valve operating unit comprising a vertical housing having a bottom seat adapted to be supported upon a valve bonnet and inclosing the operating mechanism, a valve stem extending through said seat and into said housing, a sleeve-like bearing extending upwardly from said seat and surrounding said stem, a gear journalled upon said bearing sleeve and having an abutment upon its upper face, a skirt secured upon the upper end of said stem and overlying said sleeve bearing and having an arm in the path of said abutment, supporting means in said housing, a hydraulic motor supported by said supporting means and having a gear in mesh with said first mentioned gear, a bearing block in the top of said housing having a bottom seat, a pump secured to said bottom seat, a valve in said housing having communication with said hydraulic motor, said housing forming a fluid chamber, a fluid inlet pipe extending from said chamber to said bearing block and said block having a fluid passage extending from said inlet pipe to said pump and a fluid passage from said pump to said valve.

3. In a valve operating unit comprising a housing having a bottom seat adapted for resting upon a valve bonnet and inclosing the valve operating mechanism, said seat having a vertically extending sleeve-like bearing, a valve stem extending through said seat and bearing and into said housing, a gear journalled upon said bearing sleeve and having a lug upon its upper face, means secured upon the upper end of said stem and having an arm in the path of said lug, a hydraulic motor in said housing having a gear in mesh with said first mentioned gear, a bearing block in the top of said housing, a pump secured to the bottom of said bearing block, a valve in said housing for controlling said hydraulic motor, said housing constituting a fluid chamber, a fluid inlet pipe extending from said chamber to said bearing block and said block having fluid passages extending from said pipe to said pump and from said pump to said valve.

4. In a valve operating unit comprising a housing having a bottom seat adapted for resting upon a valve bonnet, said seat having an upwardly extending sleeve bearing, a gear journalled upon said sleeve bearing, a valve stem extending through said seat and bearing, a member secured upon the upper end of said stem, said member and stem having coacting impact means, an auxiliary housing in said housing, a hydraulic motor mounted in said auxiliary housing and having a gear in meshing relation with said first mentioned gear, a block in the upper end of said housing, a pump secured to said block, said housing constituting a fluid chamber, a reversing valve above said hydraulic motor, said block having a fluid inlet passage to said pump and a fluid outlet passage to said reversing valve and means for operating said pump.

5. In a valve operating unit comprising a vertical housing having a bottom seat adapted for being supported upon a valve bonnet, said seat having an upwardly extending bearing sleeve, a gear journalled upon said sleeve bearing and having a lug upon its upper face, a valve stem extending through said seat and bearing sleeve, a skirt secured to the upper portion of said stem over said bearing and having an arm in the path of said lug, a hydraulic motor in said housing having a gear in meshing relation with said first mentioned gear, said housing constituting a fluid chamber, a block in the upper part of said housing, a pump secured to said block, a control valve for said motor, said block having a fluid inlet passage to said pump and a fluid outlet passage from said pump to said control valve and means on said housing for operating said pump.

CARL MOREY.

REFERENCES CITED

The following references are of record in the file of this patent:

UNITED STATES PATENTS

| Number | Name | Date |
|---|---|---|
| 462,762 | Ferrell | Nov. 10, 1891 |
| 468,334 | Ferrell | Feb. 9, 1892 |
| 630,278 | Wiley | Aug. 1, 1899 |
| 1,264,282 | Deaving | Apr. 30, 1918 |
| 1,616,841 | Beebe | Feb. 8, 1927 |
| 1,886,518 | Beckwith | Nov. 8, 1932 |
| 1,994,336 | Dawson | Mar. 12, 1935 |
| 2,028,696 | Beckwith | Jan. 21, 1936 |
| 2,092,019 | Randel | Sept. 7, 1937 |
| 2,232,428 | Benedek | Feb. 18, 1941 |
| 2,268,135 | Dornhöfer | Dec. 30, 1941 |
| 2,307,544 | Robinson | Jan. 5, 1943 |
| 2,352,140 | Trott | June 20, 1944 |
| 2,387,215 | Fawkes | Oct. 16, 1945 |
| 2,389,473 | Vickers | Nov. 20, 1945 |
| 2,396,993 | Fawkes | Mar. 19, 1946 |

FOREIGN PATENTS

| Number | Country | Date |
|---|---|---|
| 172,084 | Great Britain | Nov. 24, 1921 |